US007661026B2

(12) United States Patent
Risi (10) Patent No.: US 7,661,026 B2
(45) Date of Patent: Feb. 9, 2010

(54) ACCESS BY DISTRIBUTED COMPUTERS TO A SAME HARDWARE RESOURCE

(75) Inventor: Diego Risi, Salerno (IT)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 10/851,726

(22) Filed: May 21, 2004

(65) Prior Publication Data

US 2005/0022056 A1 Jan. 27, 2005

(30) Foreign Application Priority Data

May 27, 2003 (EP) .................................. 03368050

(51) Int. Cl.
*G06F 11/00* (2006.01)
(52) U.S. Cl. .............................. 714/13; 714/2; 714/10; 714/11; 709/226; 709/229
(58) Field of Classification Search ................... 714/10, 714/11, 13, 2, 4; 709/226, 229, 266
See application file for complete search history.

(56) References Cited

U.S. PATENT DOCUMENTS

| 5,812,751 | A   | * | 9/1998  | Ekrot et al. ................... 714/13  |
| 5,860,861 | A   | * | 1/1999  | Lipps et al. ................... 463/36  |
| 5,901,325 | A   | * | 5/1999  | Cox .............................. 710/1   |
| 6,363,497 | B1  | * | 3/2002  | Chrabaszcz .................. 714/13    |
| 6,449,733 | B1  | * | 9/2002  | Bartlett et al. ................ 714/13 |
| 6,718,415 | B1  | * | 4/2004  | Chu ............................ 710/301  |
| 6,944,788 | B2  | * | 9/2005  | Dinker et al. .................. 714/13  |
| 6,990,320 | B2  | * | 1/2006  | LeCren ......................... 714/13   |
| 2003/0128384 | A1 | * | 7/2003  | Nelson et al. ............... 358/1.15 |
| 2003/0161101 | A1 | * | 8/2003  | Hillyard et al. ............... 714/10 |
| 2003/0200480 | A1 | * | 10/2003 | Beattie ......................... 714/13 |
| 2004/0010732 | A1 | * | 1/2004  | Oka ............................. 714/13  |
| 2004/0078654 | A1 | * | 4/2004  | Holland et al. ................ 714/13  |
| 2004/0186942 | A1 | * | 9/2004  | Olarig ......................... 710/313  |

OTHER PUBLICATIONS

IBM HACMP Version 4.4.0 Enhances High-Availability Processing for Mission-Critical Applications, Software Announcement, Jun. 20, 2000 (http://www-306.ibm.com/common/ssi/rep_ca/3/897/ENUS200-183/ENUS200-183.PDF).

* cited by examiner

*Primary Examiner*—Robert Beausoliel
*Assistant Examiner*—Joseph D Manoskey
(74) *Attorney, Agent, or Firm*—Arthur J. Samodovitz (57) ABSTRACT

A computer system and method for allowing either a primary computer or a backup computer to access a hardware resource, depending on which computer is executing an application that needs the hardware resource. A switch is connected to the hardware resource, the primary computer and the backup computer such that in one state, the switch connects the hardware resource to the primary computer, and in another state, the switch connects the hardware resource to the backup computer. Initially, the primary computer executes the application using the hardware resource. However, when the primary computer ceases to execute the application, the switch connects the hardware resource to the backup computer, and the backup computer executes the application or copy thereof using the hardware resource.

3 Claims, 6 Drawing Sheets

ACCESS BY DISTRIBUTED COMPUTERS TO A SAME HARDWARE RESOURCE

BACKGROUND OF THE INVENTION

The present invention relates generally to computer systems and deals more particularly with distributed computers that can access a common hardware resources.

Examples of (peripheral) hardware resources are CRTs, LCDs, plasma monitors, printers, modems, scanners and remote facsimile machine. Fault-tolerant and other computers often need to share or otherwise access peripheral hardware resources. In a fault-tolerant computer system, the tasks that are considered more critical for the computer system owner (for example, production tasks) are guaranteed to continue without interruption despite a failure of one of the computers. This requires redundancy of the computers and some hardware resources. A "High-availability" ("HA") computer system has less redundancy and is less costly than a "fault-tolerant" computer system, but will experience short periods of interruption due some types of failures.

A HA computer system may include a cluster of certain resources (for example, central processing units and storage devices) associated with a primary (for example, a production server) or other computer. These resources are linked to each other so that they can be moved together ("mirrored") to a back-up computer to ensure redundancy for the computer and its software applications. In the event of a failure of the primary computer, the back-up computer can take over some or all of the applications of the failed computer.

A software application, when running on the primary computer, may also use one or more peripheral hardware resources accessible to the primary computer. In order to render that software application highly available, the computer peripheral resources need to be accessible to the backup computer when the primary computer becomes unavailable.

It was known for multiple computers on a network to share a hardware resource, such as a printer of a certain type, connected to the network. (The hardware resource can also be a Remote Asynchronous Node (RAN) connected to a network via a terminal server.) When the hardware resource is connected to the network, the hardware resource and the computers are identified by respective network addresses such as IP addresses. Known software, including that in HA computer systems, can autonomously collect network devices addresses. In high availability environments, an application initially runs on a primary computer as long as the primary computer is functional, and will run on the backup computer when the primary computer fails. The application needs access to the hardware resources. Backup control software is stored in storage available to both computers. The backup computer invokes the backup control software when the primary computer fails. With this backup control software, the application on the back-up computer can access the hardware resource via the network devices. However, it is more expensive and complicated to share resources from a network than to directly attach them to a computer, and some hardware resources are designed for direct attachment, not network attachment.

Also, known HA management software cannot automatically migrate some peripheral hardware resources at the time of the take-over. For example, some hardware resources, such as local printers, display devices, modems and the like, are directly connected to the primary computer, do not have a network interface and cannot be automatically re-assigned to the back-up computer at the take-over. Thus, when a failure occurs in the primary computer, an operator has to manually disconnect these hardware resources from the primary computer and re-connect them to the back-up computer. Depending on the location of the back-up computer, this may involve transport of the hardware resources. This is burdensome and delays the operability of the backup computer.

It was known to provide every computer with its own, directly connected resources of these types; however this is expensive and requires maintenance of additional resources, even when not used. Also, some of the hardware resources are connected to other devices which complicates the takeover. For example, a hardware resource in the form of a serial multiport connects to other devices in the form of terminals, modems and the like.

Also, in some cases, a hardware resource must be available in a specific physical location, such as a display in a waiting room of a building or a printer that uses sequenced forms. In such a case, it is not viable to duplicate the hardware resource for the backup computer.

An object of the present invention is to allow a hardware resource to be accessed by two or more computers, one at a time.

Another object of the present invention is to allow a hardware resource to be accessed by two or more computers, one at a time, with comparable simplicity as a direct connection.

Another object of the present invention is to allow a hardware resource to be accessed by a primary computer when the primary computer is functional, and by a backup computer when the primary computer fails.

SUMMARY OF THE INVENTION

The invention resides in a computer system and method for allowing either a primary computer or a backup computer to access a hardware resource, depending on which computer is executing an application that needs the hardware resource. A switch is connected to the hardware resource, the primary computer and the backup computer such that in one state, the switch connects the hardware resource to the primary computer, and in another state, the switch connects the hardware resource to the backup computer. Initially, the primary computer executes the application using the hardware resource. However, when the primary computer ceases to execute the application, the switch connects the hardware resource to the backup computer, and the backup computer executes the application or copy thereof using the hardware resource.

According to features of the present invention, there is a network connecting the primary computer to the backup computer. A program executes in the primary computer, detects when the primary computer ceases to execute the application and notifies the backup computer to obtain a copy or instance of the application from the primary computer and begin executing the application or copy thereof.

According to other features of the present invention, the switch includes first signal lines to operably interconnect, in the one state, the primary computer to the hardware resource. The switch also includes second signal lines to operably interconnect, in the other state, the backup computer to the hardware resource. The switch also includes control lines connected to the primary computer and the backup computer to allow the primary computer and backup computer to determine which of the computers is connected by the respective signal lines to the hardware resource.

DETAILED DESCRIPTION OF THE PREFERRED EMBODIMENT

Figure 1:
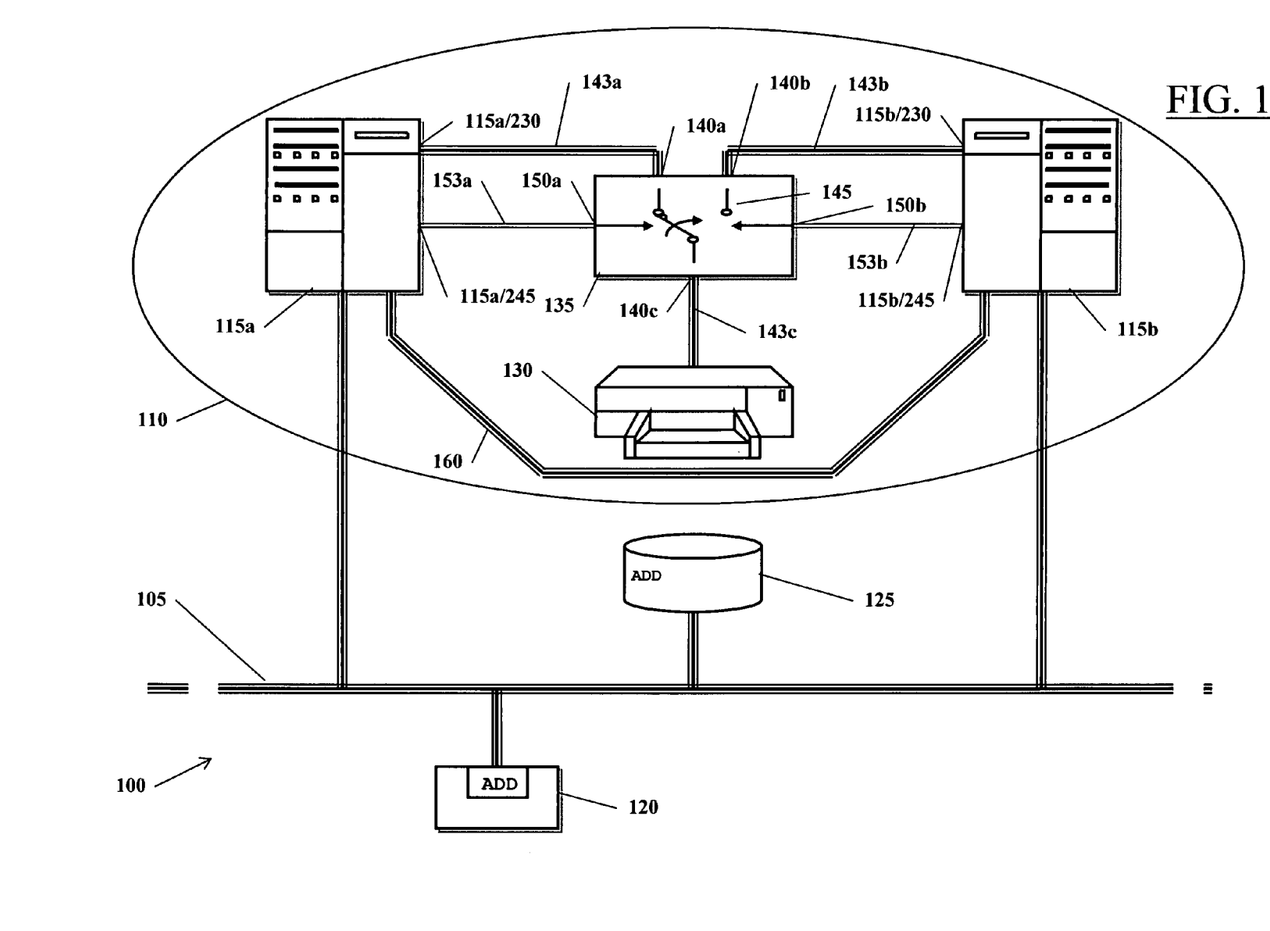
FIG. 1 is a block diagram a computer system which includes the present invention to selectively switch a hardware resource to either of two computers.

FIG. 1 illustrates a computer system 100 which includes the present invention. By way of example, computer system 100 provides the computing infrastructure or production environment of an enterprise, a bank, a public administration agency, an Internet service provider or the like. Computer system 100 includes personal computers and/or workstations, printers, mass-storage devices and the like, connected to each other through a data communication network 105. Data communication network 105 can be a Local Area Network (LAN), a Metropolitan Area Network (MAN), a Wide Area Network (WAN), the Internet or a combination of these networks. In the illustrated example, data communication network 105 is an Ethernet, although any other network type is suitable, such as token-ring, FDDI or wireless network.

Computer system 100 comprises a high-availability computer cluster 110 designed for ensuring high availability of one or more software applications that are considered critical for the activity or business of the owner of the computer system 100. High-availability computer cluster 110 includes a primary computer or note 115a, and a back-up computer or node 115b, both connected to data communication network 105. Primary computer 115a is for example the production server computer, i.e., the computer that, in the computer system 100, supports the application programs critical for the activity or business of the owner of the computer system. Examples of tasks that can be managed by the production server computer 115a are accounting, business management, manufacturing process control, workflow management, inventory management, or e-commerce. One or more of these tasks are performed by the production server computer by means of dedicated application programs. The back-up computer 115b is capable of taking over the activities of the primary computer 115a in the event of failure of the primary computer 115a, and vice-versa, based on a high-availability management program. High-availability management program monitors the activities of computers 115a and 115b, particularly those related to execution of the critical application programs. When the high-availability program detects one or more predefined failures in the primary computer 115a, the high-availability program causes back-up computer 115b to take over the activities previously managed by the primary computer 115a (and vice versa) with a minimum interruption of the system functionalities and as transparently as possible. One suitable commercially-available high-availability management programs is "High Availability Cluster Multi-Processing"(HACMP) program by International Business Machines Corporation, designed in particular for server machines of the IBM RS/6000 series. Such a program guides the user to configure the resources that must be maintained highly available (disk spaces, IP addresses, etc.) and the applications that use them. The program also monitors all nodes of the HACMP system by checking if a failure makes one or more resources unavailable and identifies what limits or stops some applications. The program also intervenes, in case of a failure, by transferring the involved resources to another, available node of the cluster, and then restarting the related application on this other node. In order to permit such switch-over by the high-availability management software operating, computers 115a and 115b communicate with each other over data communication network 105 or (or additionally) over a dedicated, distinct data communication channel 160, for example connecting to each other serial ports of the computers 115a, 115b.

Figure 2:
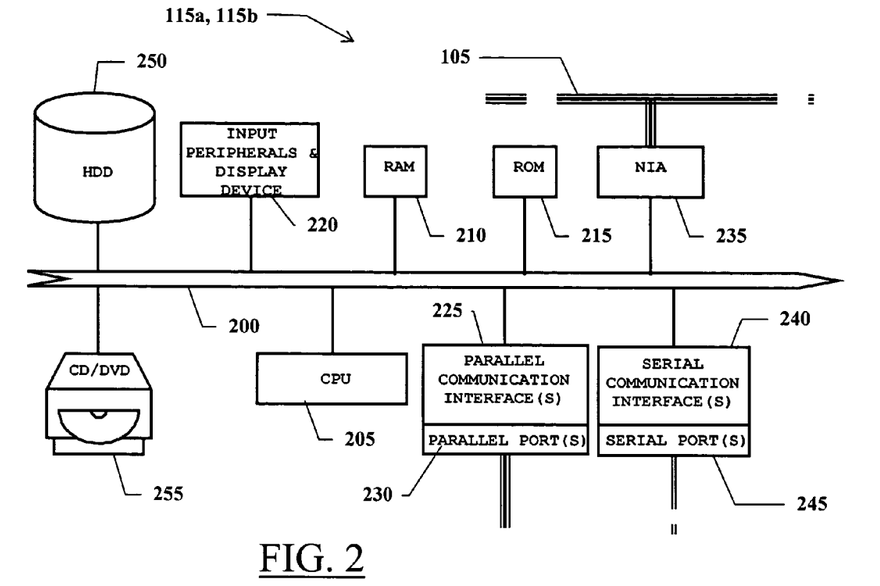
FIG. 2 is a more detailed block diagram of each of the computers of FIG. 1.

As shown in FIG. 2, each of the computers 115a, 115b comprises the following functional units connected in parallel to a data communication bus 200: a central processing unit (CPU) 205 which comprises one or more processors such as a RISC processor, a working memory 210 such as a random access memory (RAM), and a read only memory (ROM) 215, The CPU controls the operation of the computer 115a or 115b. The CPU uses RAM 215 for execution of programs and temporary storage of data. ROM 215 stores a basic program for boot up of computer 115a or 115b. By way of example, bus 200 is a PCI bus, and computers 115a and 115b include several peripheral hardware devices 220 connected to the bus 200 by means of respective interfaces. Peripheral units 220 include a keyboard and mouse, and a display device, such as a CRT, an LCD or a plasma monitor.

Each of computers 115a and 115b also includes a network interface adapter (NIA) card 235, for example a Fast Ethernet adapter, for connection to data communication network 105. Additional data communication interfaces are also provided, such as one or more parallel communication interfaces 225, accessible via respective parallel communication ports 230. By way of example, these parallel communication ports can be Centronics type for the connection of a printer. The interfaces also include one or more serial communication interfaces 240, accessible via respective serial communication ports 245, for the connection of modems, and/or Universal Serial Bus (USB) interfaces/ports, for the connection of a variety of different hardware peripherals. By way of example, these serial communication ports can be RS232 and/or RS432 type.

Each of computer 115a and 115b also includes peripheral storage devices 250 for local mass-storage of programs (for example, an operating system and application programs) and data. The storage devices 250 can be Hard-Disk Drives (HDD), a CD-ROM/DVD driver 255, or a CD-ROM/DVD juke-box, for reading/writing CD-ROMs/DVDs. Other peripheral storage devices may also be included such as a floppy-disk drive, and a memory card reader/writer.

There may be other, similarly architected computer systems in cluster 110.

Referring back to FIG. 1, computer system 100 also includes a network resource 120, hardware or software, which is used by the highly-available program and accessed through data communication network 105. By way of example, network resource 120 comprises a network printer equipped with a suitable print server, a router, a terminal connected to the network through a terminal server, or another computer. Network resource 120 is identified within computer system 100 by a respective network address "ADD". Computer system 100 also includes a storage device 125 which is accessible by both computers 115a and 115b and stores backup information including the address ADD of the network resource 120. Back-up computer 115b uses this information, once it has taken over the application previously running on the primary computer 115a, to address the necessary network resources within the computer network 100. By way of example, storage device 125 may be a SCSI or SSA external hard disk. Storage device 125 can be physically connected to all the computers 115a and 115b of the high-availability cluster 110, and accessed by any of these computers one at a time.

System 100 also includes another resource 130 that is needed by the highly-available software program for performing its tasks. Resource 130 is not designed for access through data communication network 105; instead, resource 130 is designed to be physically connected to only one computer at a time. Consequently, resource 130 must be physically connected directly to the computer 115a or 115b which is currently executing the highly-available program. In the illustrated embodiment, resource 130 is a printer without a network connectivity, for example a laser printer. However, resource 130 could also be a display devices, such as CRT, LCD or plasma monitors, or a modem or scanner. Conventionally, these types of resources, normally hardware devices, need to be directly connected to the computer running the application or applications that use them. Some operating systems allow configuration of the parallel port 230 of the primary computer 115a as a resource sharable with other computers, such as the back-up computer 115b. However, in this case the printer operability cannot be guaranteed when the primary computer 115a undergoes a failure. Similarly, a monitor, connected to the VGA adapter port of the primary computer 115a, needs a direct connection to the computer that uses it.

In accordance with the present invention, a resource physical connection switch 135 is installed between printer 130 and primary computer 115a and backup computer 115b. Switch 135 switches the physical, cable connection of the printer 130 from primary computer 115a to back-up computer 115b, and vice versa. Switch 135 includes ports 140a and 140b that are connected, by means of standard printer cables 143a, 143b, to the parallel ports 115a/230 and 115b/230 of primary and back-up computers 115a and 115b, respectively. Switch 135 also includes a third port 140c that is connected, via a standard printer cable 143c, to the printer 130. Switch 135 also includes electromechanical or electronic switches 145 to selectively connect the third port 140c (and printer 130) to either of ports 140a and 140b (and computer 115a or 115b). By way of example, ports 140a, 140b and 140c are equipped with standard parallel-port or Centronic-type connectors, and can be cable-connected to the parallel ports of the computers 115a and 115b, and to the printer 130, through known printer cables. The number of switches 145 equals the number of different signal lines in a printer cable.

Computers 115a and 115b control switch 135 via control ports 150a and 150b, respectively. The control signals determine whether switch 135 connects port 140c to port 140a or to port 140b. By way of example, switch 135 receives the control signals from computers 115a and 115b over serial communication channels, such as an RS232 or an RS432 communication channel. In this case, control ports 115a and 115b are connected by standard cables 153a and 153b to serial ports 115a/245 and 115b/245 of computers 115a and 115b, respectively. Alternatively, switch 135 receives the control signals over USB communication channels, and control ports 115a and 115b are USB ports, cable-connectable to corresponding USB ports of computers 115a and 115b, respectively. Alternately, switch 135 receives the control signals over parallel data communication channels of the same type used for controlling and sending data to printers. It is also possible that one control port of the switch 135 is a USB port and the other an RS232 port.

Figure 3:
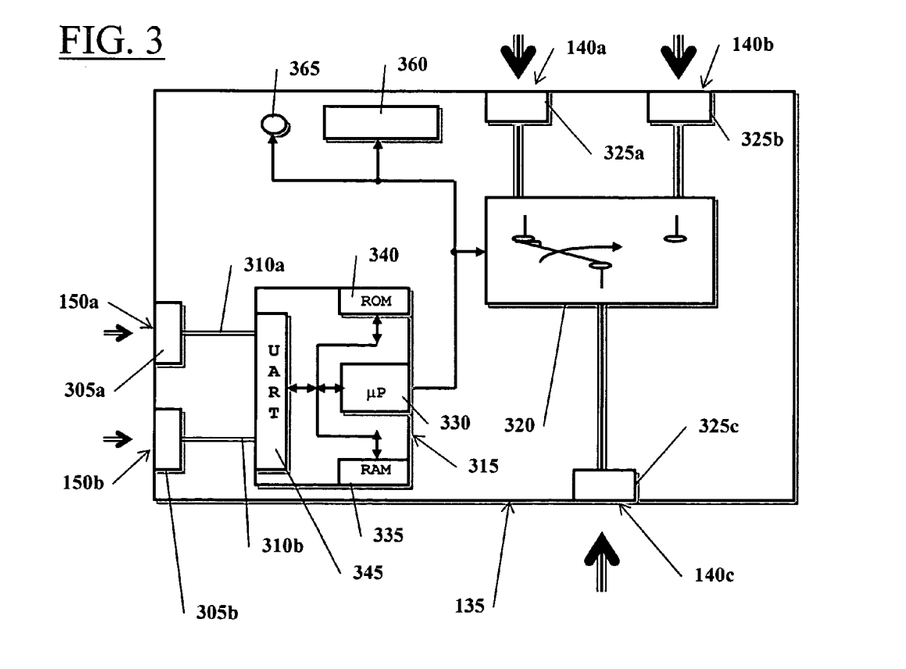
FIG. 3 is a more detailed, block diagram of the switch of FIG. 1.

FIG. 3 illustrates switch 135 in more detail. Ports 140a, 140b and 140c include respective connectors 325a, 325b and 325c, such as the type normally used in computers for the connection to a printer (parallel-port connectors). However, the specific type of connectors 325a, 325b and 325c depends on the kind of hardware resource 130 to be connected to the computers 115a and 115b. For example, when hardware resource 130 is a monitor, connectors 325a, 325b and 325c are VGA connectors, and when hardware resource 130 is a modem, connectors 325a, 325b and 325c can be serial-port or RJ45 connectors. Each of the control ports 150a and 150b includes a respective connector 305a, 305b, for example an RS232 or RS432 connector, or alternately, USB connectors, or parallel-port connectors, for the cable connection of the switch control ports 150a and 150b to the respective ports 115a/245 and 115b/245. Signal lines 310a and 310b respectively coming from the connectors 305a and 305b are fed to a switch control unit 315. In one embodiment of the present invention, switch control unit 315 includes a microprocessor 330 with associated RAM 335 and ROM 340 (alternatively, a microcontroller with embedded RAM and ROM resources), and a serial communication interface 345, for example a Universal Asynchronous Receiver/Transmitter (UART). Microprocessor 330, RAM 335, ROM 340 and serial communication interface 345 are connected to each other via a communication bus, in a structure similar to that depicted in FIG. 2.

Microprocessor 330 executes a microprogram which executes switch commands from computers 115a and 115b received over the communication channels connected to the switch control ports 150a and 150b. These communications can comply with a predefined communication protocol. Switch control unit 315 controls two-position switches 320. Each switch 320 is associated with a respective signal line coming from connector 325c, and allows selective connection to either connector 325a or connector 325b. Upon receiving a suitable command from the control unit 315, all the switches 320 switch from one position to the other such that switches 320 electrically connect all the lines coming the connector 325c to all the lines coming leading to connector 325a or all the lines leading to connector 325b. The switches can be electronic switches (e.g., based on transistors) or electro-mechanical switches, based on relays. Any kind of electronic component having a switching capability can be used (taking into account the voltage levels involved in the specific case). The number of switches 320, their type, the number of switching positions of each switch depend on the type of device 130 and the number of computers in cluster 110 that may need access to the device 130.

The switch 135 may also include a display device 360, such as a small LCD display, controlled by the switch control unit 315, to indicate which of computers 115a, 115b is currently connected to the device 130. Switch 135 may also include a status indicator 365, such as a green LED to indicate normal operation where all computers of the cluster are connected to the switch and a red LED to indicate an abnormal operation where one or more computers of the cluster are not connected to the switch.

The operation of the high-availability computer cluster 110 equipped with the switch 135 will now be described with reference to FIG. 4. In this example, computer cluster 110 is based on IBM RS/6000 systems with AIX operating system and equipped with the HACMP high-availability management software solution for AIX. However, other types of computers, operating systems and high-availability management programs can also be used. In the context of the HACMP high-availability management software solution, a software application to be rendered highly available is defined with an object called "application server". The application server and requisite shared resources are grouped together to form an object referred to as a "resource group".

The "shared resources" are those needed for execution of the highly available application and are accessible concurrently by the computers of the cluster. Other examples of such shared resources are Small Computer System Interface (SCSI) or Serial Storage Architecture (SSA) external disks, which are physically connected to every node of the cluster. The high-availability management software generates on each node the correct sequence of operations enabling that node to access the resource. On the contrary, resource 130 in the example of FIG. 1 is not considered a "shared resource" because it cannot be physically connected to more than one computer at a time.

When a resource group, including an application server, is to be activated on a node of the cluster, the application server is activated only after a successful activation of all the other resources of the resource group. For purposes of illustration, the resource group can contain only one application server defining a high availability software application. The high availability software application needs printer 130. The high availability software application initially runs on the primary computer 115a of the cluster 110. Consequently, the high-availability management software activates the resource group including the application server defining the high availability application. The high-availability management software preliminarily activates all the shared resources included in the resource group. Then, the high-availability management software causes the switch 135 to connect the printer 130 to the primary computer 115a. For this purpose, the high-availability management software may invoke a script containing an operating system command (possibly, a specifically-designed script sold together with or accompanying the switch) suitable for causing a predetermined command sequence to be outputted from the port 115a/245. If provided, an indication that the resource 130 is currently assigned to the primary computer 115a can be displayed on the display device 360 of the switch 135. After all the shared resources included in the resource group have been activated and the printer 130 has been connected to the primary computer 115a, the high-availability management software activates the application server, for launching the target application.

Figure 4:
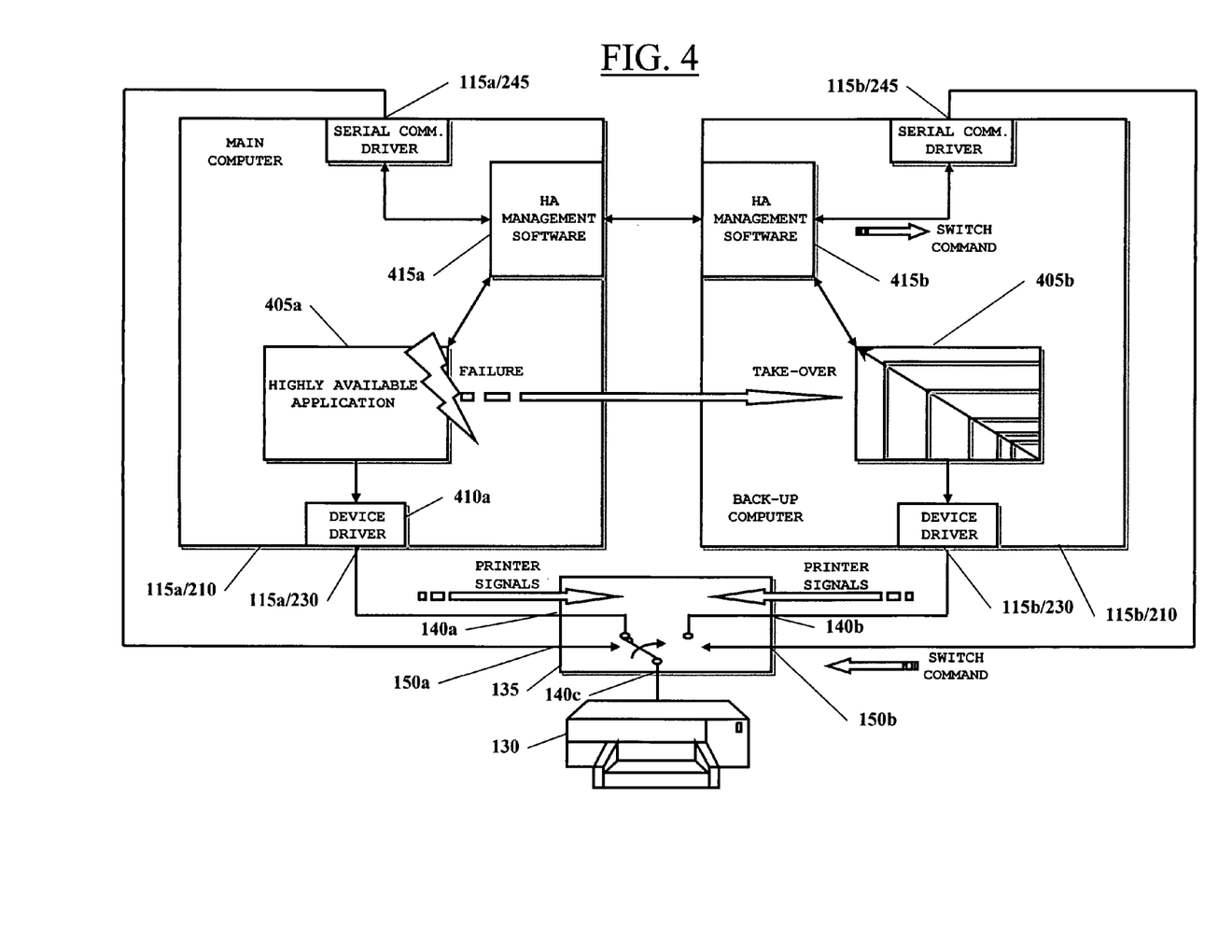
FIG. 4 is a block and flow diagram of the present invention corresponding to the computer system of FIGS. 1 and 2.

FIG. 4 illustrates some content of working memories 115a/210 and 115b/210 of the two computers 115a and 115b. Initially, primary computer 115a executes the highly available software application 405a. The highly available software application 405a communicates with printer 130 by a suitable software driver 410a, also running in primary computer 115a. The highly available software application has components 415a and 415b in computers 115a and 115b, respectively, which communicate with each other to control which computer is connected to the switch 135. Highly available management software component 415a monitors execution of the highly available software application 405a executing in primary computer. As long as primary computer 115a executes without problem, the high availability management software component 415a commands the switch 135 to connect the printer 130 to primary computer 115a. However, when the high availability management software component 415a detects a failure in primary computer 115a, preventing it from executing the highly available software application 405a, the high availability management software component 415a notifies the companion high availability management software component 415b running in back-up computer 115b. In response, the highly available management software component 415b causes the back-up computer 115b to begin to execute the highly available software application that was running in primary computer 115a. Accordingly, back-up computer 115b reactivates the resource group including the application server defining the highly available software application. All the shared resources included in the resource group of the primary computer are activated. For example, the storage unit 125 is accessed, and the network addresses of the network resources needed by the highly available software application 405b are retrieved (for example, the address ADD of the network resource 120). The printer 130 is then caused to be connected to the back-up computer 115b. To accomplish this, the highly availability management software component 415b generates and provides to the switch 135 commands that, once received and interpreted by the control unit 315, cause the switches 320 to change the connection of the printer 130 from the primary computer 115a to the back-up computer 115b. If provided, an indication that the resource 130 is now assigned to the back-up computer 115b is displayed on the display device 360 of the switch 135. As a final step, a new instantiation 405b of the highly available software application is launched on the back-up computer 115b. Thus, the take-over of the highly available software application by the back-up computer 115b is completed rapidly and automatically; it is not necessary to manually disconnect the printer 130 from the primary computer and reconnect it to the back-up computer.

A handshaking scheme can be implemented in the communication protocol for the switch commands, so that the back-up computer can be informed of the successful switching. Alternatively, or in addition, the computer that requested the resource 130 may perform a test routine for checking the resource availability; responsibility of this test can be left to the high availability management software.

Additionally, the switch 135 may be designed to support an automatic recognition procedure, enabling a computer to automatically identify that the switch is present. For example, this enables the high-availability management software component running on the back-up computer to recognize that the switch is present and that the printer 130 can be automatically re-assigned to the back-up computer. In order to avoid any device contention by the two computers 115a and 115b (normally not incurred when the two computers are governed by a high availability management software), a suitable device assignment synchronization scheme can be implemented. For example, a simple synchronization mechanism can be devised based on the presence or absence, in the file system of the computers 115a and 115b, of a specific file, with a specified name. The presence of such a file in the file system of one of the computers 115a and 115b provides an indication that such a computer is currently using the resource 130. The other computer, for example, computer 115b, before sending to the switch 135 the commands for obtaining the assignment of the resource 130, checks the presence of the file in the file system of the computer 115a. If such a file is not present, computer 115b requires the assignment of the resource 130, otherwise the computer 115b waits for the computer 115a to terminate using the resource 130. When the computer 115a terminates using the resource 130, the file is deleted from the file system, and the computer 115b can now request the assignment of the resource 130.

Figure 5:
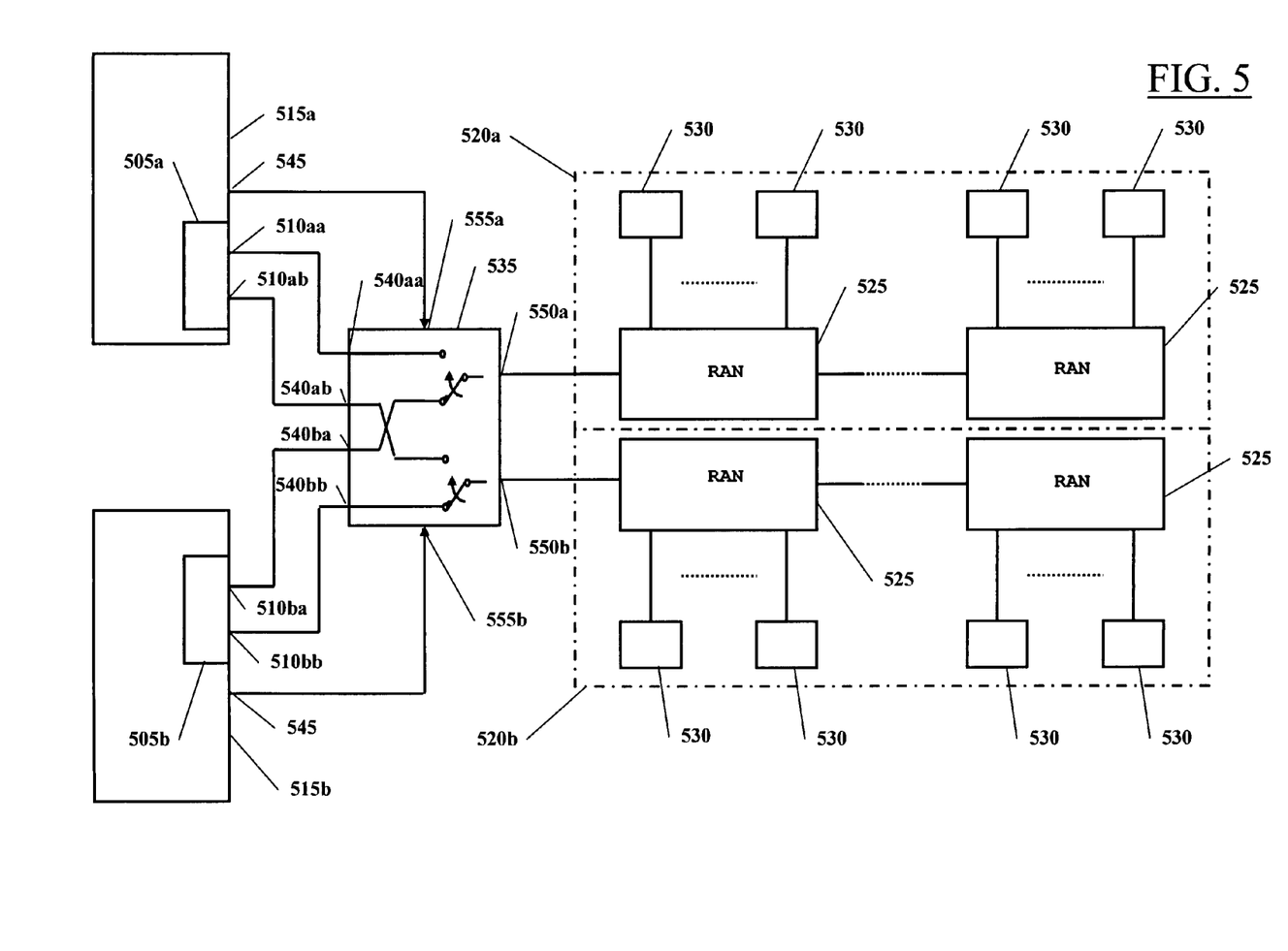
FIG. 5 is a block diagram illustrating another computer system in accordance with another embodiment of the present invention to selectively switch a hardware resource to either of two computers.

FIG. 5 schematically shows another high-availability computer cluster, including "non-sharable" hardware resources and a resource physical connection switch according to another embodiment of the present invention. The computer cluster includes two computers 515a and 515b configured for ensuring the high availability of software applications, for example two IBM RS/6000 computers equipped with the HACMP software. Both the computers 515a and 515b are also equipped with respective 128-port asynchronous adapters, schematically represented by blocks identified by reference numerals 505a and 505b, for the connection of serial peripherals to the computers 515a and 515b. In particular, each one of the 128-port asynchronous adapters 505a and 505b is an adapter board supporting two high-speed EIA 422 synchronous channels, including two ports 510aa, 510ab and 510ba, 510bb.

Each one of the two channels of each 128-port asynchronous adapters 505a and 505b can be connected to a respective chain 520a, 520b of up to four 128-port Remote Asynchronous Nodes (RAN) or concentrators 525; a RAN is an intelligent subsystem including sixteen EIA 232 asynchronous serial ports, for the connection of up to sixteen serial devices 530 (e.g., printers, modems, computer terminals and the like). Each computer 515a and 515b is also equipped with an additional serial communication port 545, particularly an RS232 or an RS432 port. Assume that at least some, if not all, of the serial devices 530 connected to the RANs 525 are needed by a highly available software application.

According to an embodiment of the present invention, the one or two chains 520a, 520b of RANs 525 are not connected directly to the ports 510aa, 510ab of the computer 115a, assumed to be the primary computer of the high availability cluster. On the contrary, a switch 535 is provided having first, second and third pairs of ports 545aa and 545ab, 545ba and 545bb and 550a and 550b, of the same type as the ports 510aa, 510ab, 510ba and 510bb. The switch 535 is capable of selectively connecting the port 550a to either one of the ports 545aa and 545ba, and the port 550b to either one of the ports 545ab and 545bb, responsive to controls received through a first and a second control ports 555a, 555b. In operation, the ports 545aa and 545ab are connected to the ports 510aa and 515ab of the primary computer 515a, the ports 545ba and 545bb are connected to the ports 510ba and 510bb of the back-up computer 515b, and the ports 550a and 550b are connected each to a respective chain of RANs 520a and 520b.

When, due to a failure, the execution of a highly available software application needs to be taken over by the back-up computer 515b, the high availability management software managing the take-over also causes the switch 535 to switch the connection of the ports 550a and 550b from the ports 540aa and 540ab to the ports 540ba and 540bb, thereby making the serial devices 530 connected to the back-up computer 515b and thus available to the new instantiation of the highly available application. The take-over of the responsibility of executing the highly available software application by the back-up computer 515b can thus be completed quickly, because in a totally unattended way, in accordance with the underlying philosophy of high availability.

A single switch can be designed to allow switching the physical connections of two or more hardware resources between two or more computers. In this case, the switch can include two or more groups of three ports, each group of three ports is specifically designed for the connection of a given hardware resource (e.g., a group of three VGA ports for the connection of a monitor, a group of three parallel ports for the connection of a printer, and the like). Each group of three ports will also be associated with a respective set of switches. A single control unit can instead be provided, for controlling each one of the switches.

Figure 6:
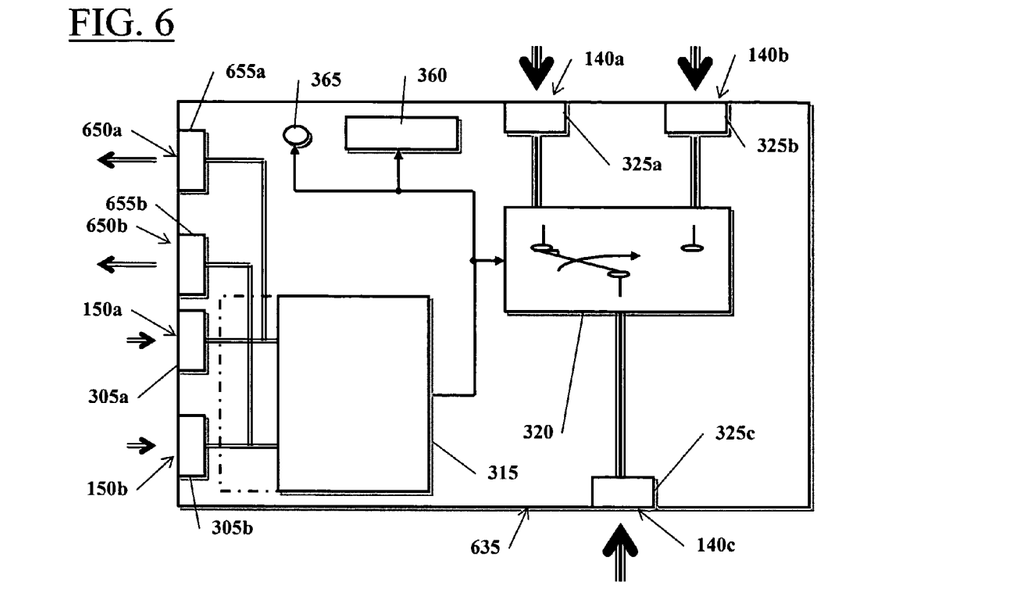
FIG. 6 is a more detailed block diagram of the switch in accordance with an alternative embodiment of the present invention.

FIG. 6 illustrates an alternate embodiment of the present invention which sets up a chain of two or more switches 635. Each of the switches 635 is intended to switch the physical connection of an associated hardware resource. Switch 635 includes two pass-through control ports 650a and 650b, each one including a respective connector 655a, 655b identical to the connector 305a, 305b of the control ports 150a, 150b. Internally to the switch 635, the connectors 655a and 655b of these two additional control ports 650a and 650b are respectively connected to the connectors 305a and 305b of the two control ports 150a and 150b. Thus, switch controls received from the computers 115a and 115b, in addition to being processed by the control unit 315 of the switch 635, can be passed through the switch 635 and made available to an additional switch, by connecting the control ports 150a and 150b of such additional switch to the pass-through control ports 350a and 350b. In this way, by adding switch after switch, a chain of switches similar to the switch 635 can be set up, each one designed for switching between two (or more) ports 140a and 140b similar or different hardware resources (for example, a printer, a monitor, a modem) to be rendered from time to time assignable to one or the other of the computers 115a and 115b. The chain of switches allows avoiding the necessity of having multiple control connections between the computers 115a, 115b and every switch: only the first switch of the chain has control connections to the computers 115a and 115b; any additional switch has control connections to the preceding switch of the chain.

In an alternative embodiment of the present invention, the pass-through control ports do not have respective connectors that are identical to the connectors of the control ports 150a, 150b. The switch 635 may in fact be equipped with pass-through control ports complying with a different standard than the control ports 150a, 150b, and be equipped with a pair of additional control ports, complying with the same standard as the pass-through ports. The switch control unit will in this case be capable of receiving switch commands from either the control ports or the additional control ports, and making the received switch commands available at the pass-through ports. In order to build a chain of switches, a first switch of the chain will receive switch commands through the control ports. The pass-through control ports of the first switch will be connected, by means of suitable cables, to the additional control ports of the second switch. All the other switches of the chain will be connected to each other through the pass-through control ports and the additional control ports. The advantage of this embodiment is that the part of the switch including the pass-through control ports, the additional control ports and the logic necessary for handling the communication through these ports can be standardised irrespective of the type of the control ports 150a and 150b.

Although in the embodiments described above, the respective switch has allowed switching of a hardware resource between two computers, there can be more computers selectively connected to the hardware resource by modifying the switch to increase the number of ports.

Figure 7:
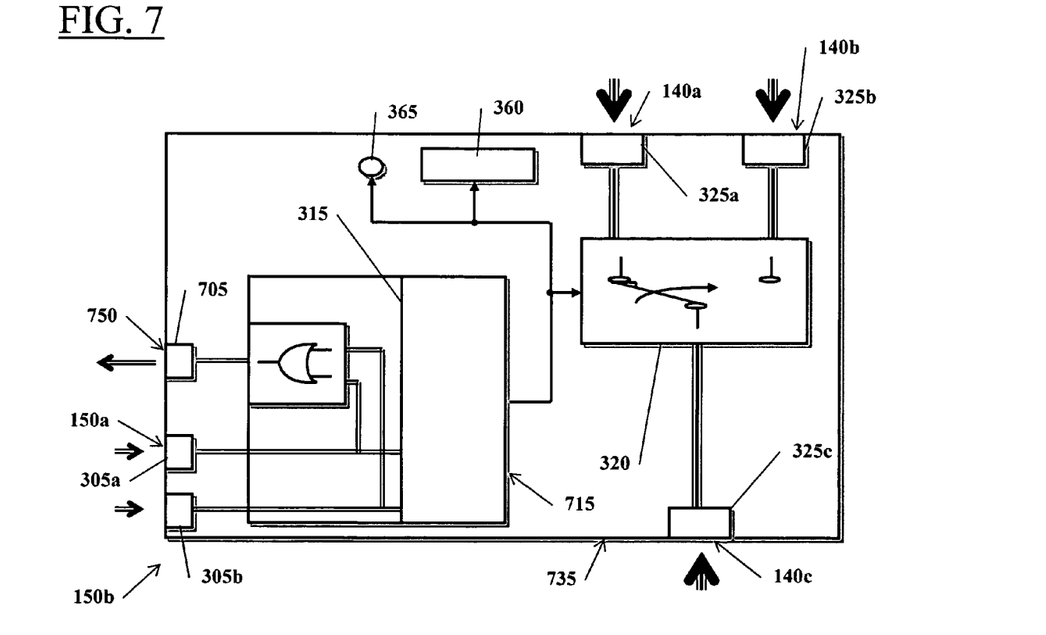
FIG. 7 is a more detailed block diagram of the switch in accordance with an alternate embodiment of the present invention.
Figure 8:
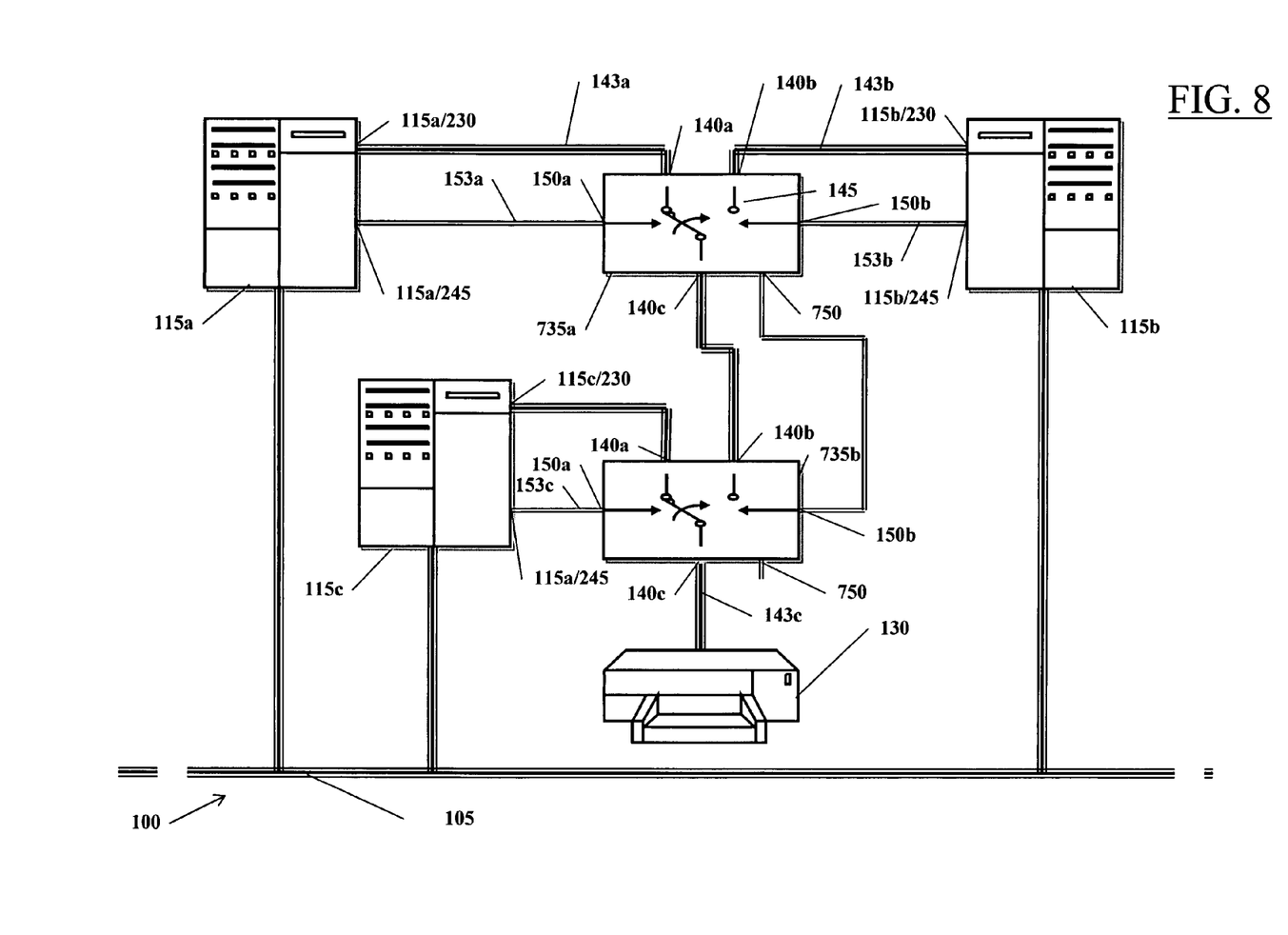
FIG. 8 is a block diagram illustrating another computer system in accordance with another embodiment of the present invention to selectively switch a hardware resource to either of three computers.

FIG. 7 illustrates an alternate embodiment which sets up a cascade of two or more switches 735. Essentially, the switch 735 additionally includes an output control port 750, with a connector 705, for example identical to the connectors 305a and 305b, for propagating to other switches control commands that are the logic OR of the control commands received through the control ports 150*a* and 150*b*. Referring to FIG. 8, a simple cascade of two switches 735*a* and 735*b* of the type shown in FIG. 7 is depicted, adapted to enable the selective connection of the printer 130 to either the computer 115*a*, or the computer 115*b* or a third computer 115*c*. Specifically, the first switch 735*a* has the ports 140*a* and 140*b* cable-connected to the computer ports 115*a*/230 and 115*b*/230, respectively, and the control ports 150*a* and 150*b* connected to the computer ports 115*a*/245 and 115*b*/245, as in the arrangement of FIG. 1. The port 140*c* of the first switch 735*a* is cable-connected to one of the ports 140*a*, 140*b* of the second switch 735*b*, in the example the port 140*b*; the ports 140*a* and 140*c* of the second switch 735*b* are cable-connected to the port 115*c*/230 of the third computer 115*c* and to the printer 130, respectively. The control ports 150*a* and 150*b* of the second switch 735*b* are respectively connected to the port 115*c*/245 of the third computer and to the output control port 750 of the first switch 735. In this way, when either one or the other of the computers 115*a* and 115*b* requests the printer 130, the second switch 735 connects the printer 130 to the port 140*c* of the first switch, which is in turn connected to either the port 140*a* or the port 140*b*, depending on which computer requested the printer 130. If none of the computers 115*a* or 115*b* needs the printer 130, the latter can be connected to the third computer 115*c* through the second switch 735*b*.

FIG. 8 illustrates this configuration and can be expanded to an indefinite number of computers, by cascading more than two switches.

As discussed above in connection with the pass-through control ports of the switch 635, the output control port 750 of the switch 735 may be a different type than the control ports 150*a* and 150*b* for the purpose of standardization. Also, the switch 735 may be equipped with an additional input control port, of the same type as the output control port 750, so that in a chain arrangement the output control port 750 of one switch of the chain can be connected to the additional input control port of the following switch.

In an alternative embodiment of the invention, a switch may be designed to include both the pass-through control ports 650*a* and 650*b* of the switch of FIG. 6 and the output control port 705 of the switch of FIG. 7; in this case, the switch is adapted to be used either in a chain arrangement or in a cascade arrangement. In particular, the switch may be designed to include, in addition to the control ports 150*a* and 150*b* of a type depending on the type of the computer ports 115*a*/245 and 115*b*/245, pass-through control ports 650*a* and 650*b*, an output control port 750 and additional input control ports all complying to a same standard (possibly a proprietary standard), not necessarily coincident with the standard of the control ports 150*a* and 150*b*.

Although in the embodiments of the invention described in the foregoing the switch comprised control ports 150*a* and 150*b* distinct from the ports 140*a*, 140*b* and 140*c* intended for the cable-connection to the hardware resource 130 to the ports 115*a*/230 and 115*b*/230 of the computers 115*a* and 115*b*, alternative embodiments can be envisaged in which the control ports coincide with the ports 140*a* and 140*b*, and the switch control commands are received from the computers 115*a* and 115*b* over the same cable connections 143*a* and 143*b* which are used for communicating with the hardware resource. For example, a time-division multiplexing scheme is used, so that the control commands are allotted different time slots compared to the control signals and data for the hardware resource; typically, the switch control commands are sent first, and after the switch is set the signals and data for the hardware resource are sent.

In still an alternative embodiment of the invention, the switch may be realised as a network device, having a network interface, for example an Ethernet adapter, and a network connection port, for the connection of the switch to the data communication network 105. In this way, the switch can be addressed by the computers 115*a* and 115*b* in the same way as any other network resource, and the control unit 315 receives the switch control commands directly over the data communication network 105. Preferably, a switch configuration port is provided for the connection of the switch to a configuration console, by means of which the switch IP address and the control commands to be recognised by the switch can be configured.

It is pointed out that the switch control commands for causing the switch to connect the hardware resource 130 associated therewith to one or the other of the computers 115*a* and 115*b* may in principle be received by a different computer, having the responsibility of deciding to which of the computers 115*a* and 115*b* the hardware resource 130 is from time to time to be assigned. In this case, the ports 140*a* and 140*b* of the switch will still be cable-connected to the ports 115*a*/230 and 115*b*/230 of the computers 115*a* and 115*b*, but the control port are connected to the above-mentioned different computer.

Although the present invention has been described in reference to high-availability computer clusters, it can be applied to other computers as well. For example, the present invention can be applied to other networked computers, running identical or different software applications periodically needing one or more hardware resource that are not sharable between the computers but must be physically connected to the computer running the application.

Although the present invention has been disclosed and described by way of some embodiments, it is apparent to those skilled in the art that several modifications to the described embodiments, as well as other embodiments of the present invention are possible without departing from the scope thereof as defined in the appended claims.

The invention claimed is:

1. A computer system comprising:
a printer;
a first computer with a first CPU, a first computer readable memory, and a first computer readable storage media;
a first application program;
a second computer with a second CPU, a second computer readable memory, and a second computer readable storage media;
a second application program having a substantially same function as the first application program;
a switch having a first printer-control port coupled to the first computer via a first printer-control cable and a first switch-control port coupled to the first computer via a first switch-control cable, a second printer-control port coupled to the second computer via a second printer-control cable and a second switch-control port coupled to the second computer via a second switch-control cable, and a third printer-control port coupled to the printer via a third printer-control cable, the first and second printer-control ports being selectively coupled to the third printer-control port based on switch-control signals applied to the first and second switch-control ports;
a first management program to monitor operation of the first application and send a switch-control signal to the first switch-control port via the first switch-control cable to connect the first printer cable to the printer via the third printer cable while the first application program is operating normally to print documents generated by the first application program, and responsive to failure of the first application program, to notify a second management program to direct the second computer to execute the second application program and send a switch-control signal to the second switch-control port via the second switch-control cable to connect the second printer cable to the printer via the third printer cable to print documents generated by the second application program, and wherein the first application program and the first management program are stored on the first computer readable storage media for execution by the first CPU via the first computer readable memory; and the second application program and the second management program are stored on the second computer readable storage media for execution by the second CPU via the second computer readable memory.

2. The computer system of claim 1 wherein:

the first said switch includes a first pass-through control port coupled to the first switch-control port, and a second pass-through control port coupled to the second switch-control port; and further comprising a computer monitor;

a second switch having a first monitor-control port coupled via a first monitor-control cable to the first computer and a third switch-control port coupled via a third switch-control cable to the first pass-through control port of the first switch to receive a control signal sent from the first computer via the first switch-control cable, and a second monitor-control port coupled via a second monitor-control cable to the second computer and a fourth switch-control port coupled via a fourth switch-control cable to the second pass-through control port of the first switch to receive a control signal sent from the second computer via the second switch-control cable, and coupled to the computer monitor via a third monitor-control cable, such that during normal operation of the first application program the first computer is concurrently connected to both the printer and the computer monitor and during failure of the first application program the second computer, instead of the first computer, is concurrently connected to both the printer and the computer monitor.

3. A computer program product to selectively control a switch to interconnect first and second computers to a same printer, the first computer to execute a first application and the second computer to execute a second application with a substantially same function as the first application, the switch having (a) a first printer-control port coupled to the first computer via a first printer-control cable and a first switch-control port coupled to the first computer via a first switch-control cable, (b) a second printer-control port coupled to the second computer via a second printer-control cable and a second switch-control port coupled to the second computer via a second switch-control cable, and a third printer-control port coupled to the printer via a third printer-control cable, the first and second printer-control ports being selectively coupled to the third printer-control port based on switch-control signals applied to the first and second switch-control ports, the computer program product comprising:

a computer readable storage media;

a first management program to monitor operation of the first application and send a switch-control signal to the first switch-control port via the first switch-control cable to connect the first printer cable to the printer via the third printer cable while the first application program is operating normally to print documents generated by the first application program, and responsive to failure of the first application program, to notify a second management program to direct the second computer to execute the second application program and send a switch-control signal to the second switch-control port via the second switch-control cable to connect the second printer cable to the printer via the third printer cable to print documents generated by the second application program, and wherein the first management program is stored on the computer readable storage media for execution by the first computer; and the second management program is stored on the computer readable storage media for execution by the second computer.

* * * * *

UNITED STATES PATENT AND TRADEMARK OFFICE
CERTIFICATE OF CORRECTION

| | |
|---|---|
| PATENT NO. | : 7,661,026 B2 |
| APPLICATION NO. | : 10/851726 |
| DATED | : February 9, 2010 |
| INVENTOR(S) | : Diego Risi |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1153 days.

Signed and Sealed this

Thirtieth Day of November, 2010

David J. Kappos
*Director of the United States Patent and Trademark Office*